(12) United States Patent
Mader

(10) Patent No.: US 7,100,508 B1
(45) Date of Patent: Sep. 5, 2006

(54) COLOR REGISTRATION TEST PATTERN

(75) Inventor: Rodney G. Mader, Springfield, OH (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 11/066,574

(22) Filed: Feb. 25, 2005

(51) Int. Cl.
*B41F 1/34* (2006.01)

(52) U.S. Cl. .................... 101/485; 101/211; 347/19

(58) Field of Classification Search ............... 101/485, 101/181, 211; 347/19; 358/1.9, 406, 501, 358/504
See application file for complete search history.

(56) References Cited

U.S. PATENT DOCUMENTS

| | | | |
|---|---|---|---|
| 4,546,700 A | 10/1985 | Kishner et al. |
| 5,453,777 A | 9/1995 | Pensavecchia et al. |
| 5,530,460 A | 6/1996 | Wehl |
| 6,076,915 A | 6/2000 | Gast et al. |
| 6,109,722 A | 8/2000 | Underwood et al. |
| 6,188,058 B1 | 2/2001 | Tullis |
| 6,198,549 B1 | 3/2001 | Decker et al. |
| 6,204,933 B1 | 3/2001 | Yoshino et al. |
| 6,246,067 B1 | 6/2001 | Tullis |
| 6,259,111 B1 | 7/2001 | Tullis |
| 6,275,244 B1 | 8/2001 | Omelchenko et al. |
| 6,300,968 B1 | 10/2001 | Kerxhalli et al. |
| 6,323,955 B1 | 11/2001 | Kanai et al. |
| 6,412,907 B1 | 7/2002 | Castelli et al. |
| 6,435,643 B1 | 8/2002 | Miura et al. |
| 6,464,319 B1 | 10/2002 | Teshigawara et al. |
| 6,480,624 B1 | 11/2002 | Horie et al. |
| 6,568,782 B1 | 5/2003 | Haselby |
| 6,571,000 B1 | 5/2003 | Rasmussen et al. |
| RE38,180 E | 7/2003 | Edge |
| 6,597,473 B1 | 7/2003 | Rasmussen et al. |
| 6,616,262 B1 | 9/2003 | Nakajima et al. |
| 6,621,585 B1 | 9/2003 | Patel et al. |
| 6,623,096 B1 | 9/2003 | Castano et al. |
| 6,644,773 B1 | 11/2003 | Bildstein et al. |
| 6,672,701 B1 | 1/2004 | Nunokawa |
| 2001/0038399 A1 | 11/2001 | Lund et al. |
| 2003/0144815 A1 | 7/2003 | Kohler et al. |

FOREIGN PATENT DOCUMENTS

| EP | 0 895 869 | 2/1999 |
|---|---|---|
| EP | 1 176 802 | 1/2002 |

*Primary Examiner*—Minh Chau
(74) *Attorney, Agent, or Firm*—Buskop Law Group

(57) ABSTRACT

A method for evaluating the stability of print module registration for a printer creates an innovative test pattern by forming two graphic images from two separate print modules. The graphic images include parallel graphic information and a desired intersection point. The graphic images are printed on by a pixel by pixel basis onto print media from the separate print modules. The resulting patterned image or test pattern is viewed to ascertain alignment based on the desired intersection point.

23 Claims, 3 Drawing Sheets

COLOR REGISTRATION TEST PATTERN

FIELD OF THE INVENTION

The present embodiments relate generally processes of registering the printed images created from multiple single-array ink jet print heads. The present embodiments relate more particularly to an innovative method of visibly exposing and quantifying the amount of registration error, continuously, by means of the printed image itself.

BACKGROUND OF THE INVENTION

Continuous ink jet printing systems are known to be of use in the industry of high speed digital printing. In many installations a plurality of ink jet print heads are arranged inline over a web of paper to produce multi-color images in a single pass. In a typical printing system, to facilitate the digital printing process the ink jet print heads generate an array of micro-droplets of ink in the cross-web direction at a resolution of 300 drops per inch and at a rate of 100 Khz. The timing of the release of each cross-web pixel of droplets is computer synchronized to tachometer pulses received from the web transport system such that pixels will be released (printed) at a resolution of 300 or 600 drops per inch in the web travel direction. The tachometer pulses are also used to delay the printing of successive print heads such that the successive print head data will overlay (register) on top of the previous print head data; therefore, combining the two (or more) colors of ink from the print heads to achieve multi-color images. Inherently, this color-to-color registration process requires input from some expensive and complex electronic vision system or a system operator to observe the nominal registration error and then correct electronically as required to "zero" the average color-to-color registration error.

In addition to the average color-to-color registration error adjustment, all web transport systems contain motor servo systems that create web speed fluctuations that result in web stretch (tension) variations which in turn equates to color-to-color registration error variation around the error average. Therefore, the need arises for good color-to-color registration measurement capability—certainly for operator ease of average adjustment but more importantly, for identifying and aiding in reducing the magnitude of error variations.

Previous conventional art has led to the use of registration marks typically located at the corner(s) of each image. Marks have varied from simple lines, crosshairs, circles, or squares to combination crosshairs/circles, lines at various angles, chevron patterns, and others. While most of these approaches can be used to enable an operator to adequately adjust the average registration error near zero, the ability to use them to evaluate registration variation is marginal. Past procedures for evaluating color-to-color registration error variation in continuous ink jet printing systems utilized these marks at the corners of each image but in order to get just a minimal amount of data for statistical analysis a sample of at least 25 images would be necessary. The image registration marks would then have to be measured under magnification. At 12" image spacing this yields registration error data for 25 pixels over of a span of 90,000 pixels—a sampling rate of about 0.03%. Additionally, multi-color text imaging printed under normal conditions has been observed to vary in registration error at multiple cycles per 12" image. It is seen then that there is a need for a means of viewing registration error as the images are printed and at a sampling rate much greater than any error variation frequencies that may exist

SUMMARY OF THE INVENTION

A method for evaluating the stability of print module registration for a printer creates an innovative test pattern by forming two graphic images from two separate print modules. The graphic images include parallel graphic information and a desired intersection point. The graphic images are printed on by a pixel by pixel basis onto print media from the separate print modules. The resulting patterned image or test pattern is viewed to ascertain alignment based on the desired intersection point.

Accordingly, the present embodiments provide the benefit of visibly exposing the amount of print color-to-color registration error continuously for as long as the test pattern images are being printed. The average error can, therefore, be readily discerned. More importantly, the error variation can be characterized.

BRIEF DESCRIPTION OF THE DRAWINGS

In the detailed description of the preferred embodiments of the invention presented below, reference is made to the accompanying drawings, in which.

Figure 1:
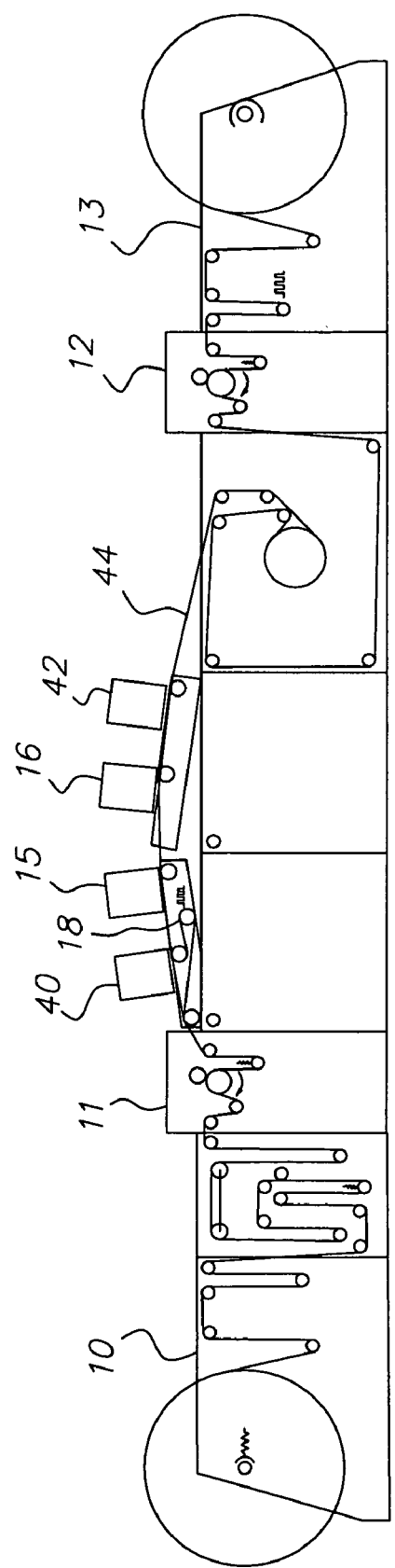
FIG. 1 depicts a typical high-speed digital ink jet printing system usable with the embodied methods.

The present embodiments are detailed below with reference to the listed Figures.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

The present embodiments provide a test pattern when printed with multiple ink jet printheads that visibly expose and quantify the actual in-track registration error of the two or more printheads.

The pattern created by the embodied methods utilizes at least two printheads printing a repetitive stepping pattern. The first printhead prints the repetitive stepping pattern at a rate of one step per in-track pixel, or 600 lines per inch, at a cross-web width of 24 pixels, 300 lines per inch. The second printhead prints the same repetitive rate a solid single pixel line designed to overlay on top of the step pattern for the entire width of all steps. An intended overprint of the two patterns occurs at one of the 24 pixels wide steps. The overprint is identified in the step pattern by 'tick' marks that are perpendicular to that step so as to visibly identify the zero error point. Each step extending in both directions from the zero steps is then identified by light 'tick' marks and corresponds to one pixel of error step away from the zero steps or one half pixel of error relative to conventional 300 pixels per inch per.

The resulting image from the printed pattern is a contrast between two colors with one of the colors viewed as a continuous band against the other. The center of the band relative to the stepped tracks is viewed as the actual registration error due to the design described above. The printed pattern effectively magnifies the registration error by a factor of at least 48, thereby making the error viewable on-the-fly or as printed images offline without the need of further magnification.

A typical test pattern designed with this innovative method can repeat every eight pixels or 600 lines per inch, thereby giving viewable registration error data every fourth pixel over the entire image length, a sampling rate of 25%.

An embodiment of the method for evaluating the stability of print module registration for a printer entails forming at least two graphic images. Each graphic image includes parallel graphic information, such as parallel lines, parallel curves, a grid pattern, a bit map, and combinations thereof. One of the sets of graphic information can be a set of single pixel steps. The graphic images can be stored on a computer, data storage devices, or can be accessible from a remote location, such as a website. The graphic images can be created remotely to the printing modules, such as at the manufacturer's location. The graphic images are used to create an overlapped printing that is indicative of the alignment, or lack of alignment of the print modules of a particular printer. One of the graphic images can include an index marking used to indicate an error amount. The error amount corresponds to adjustment needed to produce a desired point of intersection.

The set of graphic information from one of the graphic images is placed at an angle relative to the set of graphic information from one of the other graphic images. The angle is typically between about 1 degree and about 8 degrees when the graphic images are at a resolution between about 300 dpi and about 600 dpi. Preferably, the angle is two degrees when the graphic image resolution is 300 dpi.

The change of angle between the graphic images gives an ability to control the resolution of the detection, and to notice small changes in registration of the print module.

A desired intersection point is established between the graphic images. The desired intersection point is the point where the zero index is located.

The method continues by sending the each set of graphic images to respective print modules. A first set of graphic images is sent to a first print module and a second set of graphic images is sent to a second print module. The print modules can be separate from one another. The print modules can be set in sequence to one another. Examples of usable print modules include printheads for ink jet printers, printing stations for offset printers, electro-photographic printing stations, thermal transfer printheads, printing stations for gravure printers, and combinations thereof.

The set of graphic images can be sent to the print module by being transmitted directly through a connection or wirelessly as digital files or physical plates.

The sets of graphic images are printed from their respective print modules onto print media forming an overlapped image. The graphic images can be printed on by a pixel by pixel basis or on a continuous pixel by pixel basis. The print media is typically cut sheets or web media. The continuous pixel by pixel basis can entail printing that is substantially parallel to the print media, substantially perpendicular to the print media, and combinations thereof.

The methods end by viewing the overlapped image to ascertain alignment based on the desired intersection point. Viewing alignment entails viewing the actual print module alignment, viewing variations in print module alignment, viewing variations in alignment that occur due to changes in speed of the print media, and combinations thereof. Other problems can be viewed as well from the overlapped image. These problems include, but are not limited to, changes in speed of the print media, fluttering from printing, vibrations, tension on the print media, acentric orientation of the print guides are, acentric orientation of the rollers, lateral drift of the print media, and combinations thereof.

After the problems are identified, the method can include the step of performing an adjustment step while still printing. The adjustment step can include solutions like tuning paper handling servo controls; replacing rollers; correcting roller location; adjusting paper tension; adding rollers; and adjusting tachometer based print media motion sensors by location, quantity of sensors.

In an alternative embodiment, the methods entail a step of forming at least two graphic images, wherein each graphic image has an intersection point. The images contain parallel graphic information. One set of graphic information from one image is at an angle relative to the parallel graphic information of another image. The images are sent to respective print modules and printed onto print media forming an overlapped image. The overlapped image is then viewed to ascertain an average intersection point based upon comparing the first and second intersection points. The graphic images can then be adjusted based on the average intersection point until the average intersection point corresponds to a desired intersection point. Adjusting the graphic images is preferably performed without stopping the printing process.

The graphic images can be adjusted in numerous manners. For example, the spacing between the print modules can be adjusted. The spacing between one or more of the print modules in relation to the print media can be adjusted. The printing of one or more of the graphic images can be adjusted, typically using an electronic delay. The position of one or more of the print modules can be modified in relation to the print media. The position of one or more of the print modules can be modified in relation to another print module. One or more of these adjustments can be made in order to adjusted the average intersection point until the average intersection point corresponds to a desired intersection point With reference to the figures, FIG. 1 depicts a typical high-speed digital ink jet printing system. The function of this system to provide a means to feed a roll of unprinted or preprinted paper under the ink jet print heads for additional printing and then rewind the roll of printed product for storage—later to be input into a paper finishing process. The input roll is mounted to the unwinder section 10 that employs an electro-mechanical braking system designed to resist the pull from the infeed nip motor servo system section 11 and maintains a certain amount of paper stretch (tension) in that zone. The outfeed nip motor servo system section 12 is synchronized to the infeed nip speed and maintains a certain amount of paper stretch (tension) in that zone. The rewinder motor servo system section 13 is synchronized to the outfeed nip and maintains a certain amount of paper stretch (tension) in that zone.

Between the infeed and outfeed nips there are four ink jet printheads 15, 16, 40, and 42 capable of non-impact digital printing as the web passes under the printheads 15, 16, 40, and 42. Each ink jet printhead 15, 16, 40, and 42 adds one color of ink to the image as the image passes under the printhead. Each image typically contains data required to be printed from each print head (color) such in the case of full process color printing—cyan, magenta, black, and yellow colors combined. For optimum print quality, the color separations must be precisely overlaid (registered) on top of each other. A precision tachometer (pulse generator) 18 is attached a roller driven by the paper web and located near the ink jet print heads in order to synchronize the ink jet printing to the desired placement on the paper web.

The two nip motor servo systems try to maintain a constant paper stretch (tension) while at the same time trying to maintain a constant web speed. Inherent to any servo system, some variability results from speed fluctuations. The difference in speed between the two nips can be somewhat proportionally distributed at any point along the paper web between them. For example, if the infeed nip motor is running at 250 feet per minute for a given period of time and the outfeed nip is running at 254 feet per minute over that same period of time, then the web speed is presumably half way between the two at 252 feet per minute. At one-quarter the distance from the infeed nip, the speed is presumably 251 feet per minute and so on. This effect has a significant influence on the ability to maintain precise color-to-color print registration due to the fact that the tachometer used to synchronize ink jet printing to the web speed is located at one position within the web span between the two nips and the actual point at which each printhead prints are at different and various positions through the web span between the two nips. The difference between the web speed at the tachometer and the web speed at each print head will result in a proportional amount of registration error.

Many factors affect the behavior just described and in order to understand and evaluate some of the variables involved, the embodied methods can be used as an important tool to measure accurately and easily color-to-color registration error.

The embodied methods involve the design of an innovative test pattern that visibly exposes the actual registration error between any two ink jet print heads while printing. A typical printing system as shown in FIG. 1 can include some data processing equipment capable of designing, formatting, and outputting variable or fixed digital data to each ink jet print head. Such a device is utilized to develop the innovative test patterns created by the embodied methods. An image designed for output to the ink jet print heads, can be developed as individual bitmaps, converted to a downloadable font, and then selectable as ASCII characters in the data processing equipment typically used to drive print data to the ink jet print heads. The images developed in the embodied methods can be comprised of many individual bitmaps fitted together to produce the desired effective image but for the purpose of explanation, the overall image design will be discussed.

FIG. 1 is a side view of a typical printer into which the graphic images are transferred. FIG. 1 shows the printheads or print modules 40 and 42 for a continuous ink jet printer. FIG. 1 depicts the embodiment, wherein the graphic images are printed onto print media 44 in sequence. The embodied methods are examples for printing at a resolution of 300× 600 dpi and at a rate of up to 500 feet per minute. The embodied methods can be use in printers that can run at rates up to 2000 feet per minute.

Figure 2:
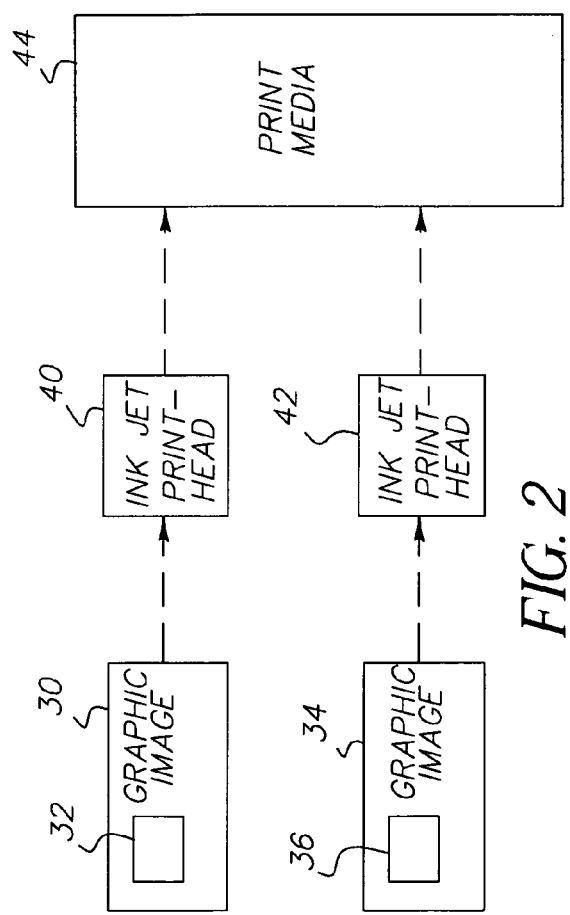
FIG. 2 is an overall schematic of an embodiment of the method for evaluating the stability of print module registration for a printer entails forming at least two graphic images.

FIG. 2 depicts an overall schematic of an embodiment of the method for evaluating the stability of print module registration for a printer entails forming at least two graphic images. Two graphic images 30 and 34, each including respective parallel graphic information 32 and 36, are transmitted to separate print modules 40 and 42. The print modules 40 and 42 each print the graphic images 30 and 34 onto a print media 44.

Alternatively, the printing procedure can be done discretely, wherein the first graphic image is printed by a first print module on one machine and the print media is transferred to a second print module for printing the second graphic image.

Figure 3:
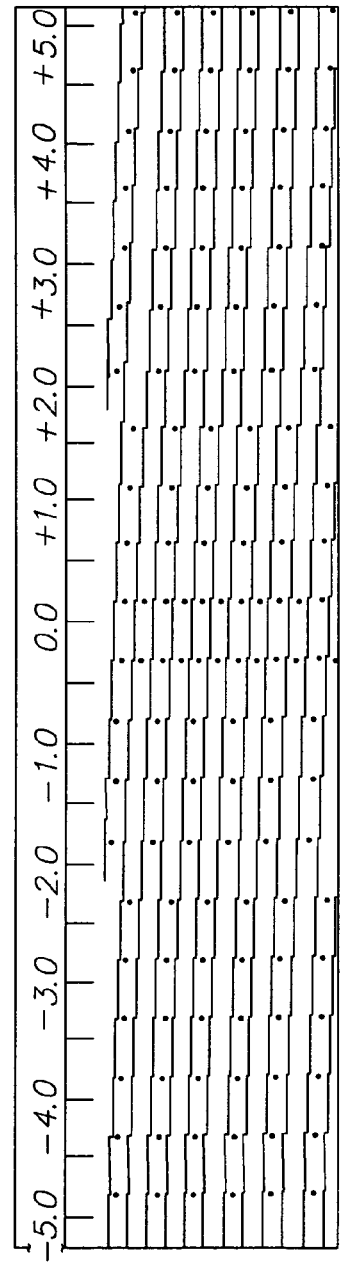
FIG. 3 depicts a print version of a first graphic image usable in the invention

The first part of the innovative test image consists of a pattern depicted in FIG. 3. FIG. 3 provides a print version of an exemplary a first graphic image with parallel graphic information, specifically having twelve parallel lines. The figure demonstrates a 'stepped' pattern to be printed with one print head of a pair used for registration error evaluation. The angled lines appear as "stair step" angled lines. Each step height represents a pixel. The "stair step" is a set of single pixel steps used to see more clearly the intersection points.

Figure 4:
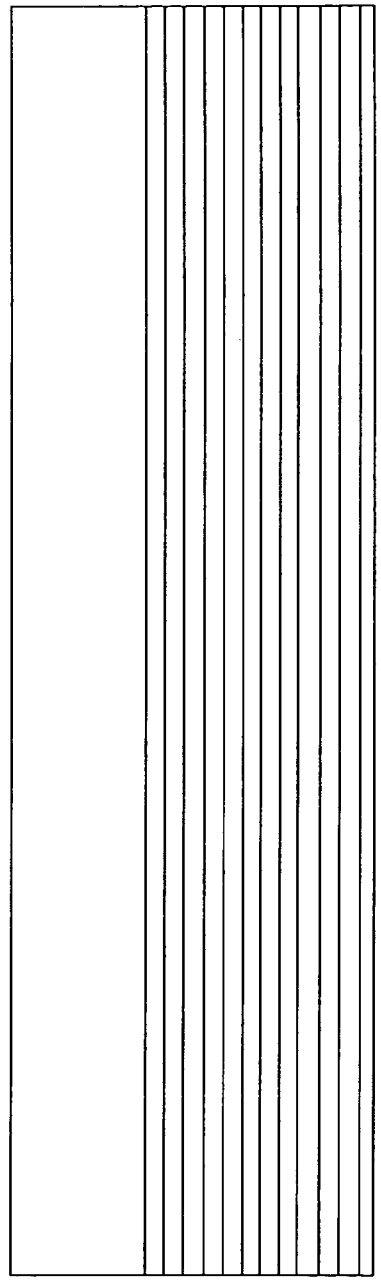
FIG. 4 depicts a print version of a second graphic image usable in the invention.

The second part of the innovative test image is depicted in FIG. 4 and is printed by the second printhead of the pair. FIG. 4 provides a print version of an exemplary graphic image with parallel graphic information, specifically having twelve parallel lines.

Figure 5:
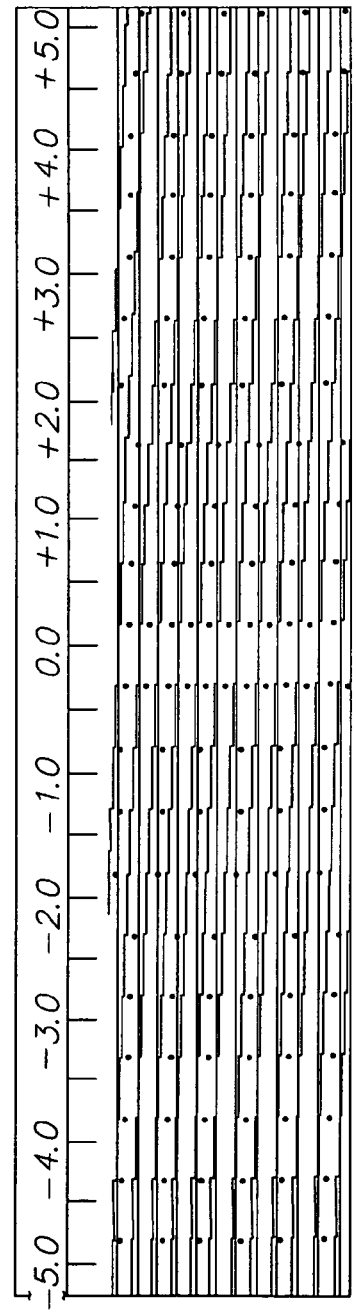
FIG. 5 depicts a printed version of an overlapped image with an index according to the invention.

FIG. 5 illustrates the results when the images are overlaid to form the complete image to be printed by the pair of print heads. Images are shown larger than scale to show detail. As shown in FIG. 5, when the solid color lines overlay on the step pattern, the two separate images become one. The overlapped image depicted in FIG. 5 can then be viewed to ascertain alignments of the printing from the at least two print modules based on the points of intersection of the overlapped image. When the solid color lines do not overlay on the stepped patterns then both of the images are still visible. This creates the contrast difference that identifies the area where the two images are in register. The alignments depicted in FIG. 5 reveal that this printer is in alignment. For this graphic image created using these two print modules of FIG. 5, the parallel graphic information is created at four pixel spacings and has index. Accordingly, the pattern reveals that the point of intersection not only occur at the desired point of intersection corresponding to the zero mark of the index, but also at point of intersection at plus four pixel and minus four pixels.

The repetitive spacing of the step pattern and the solid line pattern control the visible contrast difference. Through experimentation, a repetitive spacing of eight pixels (at 600 pixels per inch) produced the best contrast effects across a wide variety of ink color combinations. Even if a significant visible contrast between the two printed images (colors) does not occur, the pattern becomes apparent when viewed under magnification, thereby still allowing for quicker error measurements than previous procedures.

As far as putting a value on the amount of registration error exposed by the pattern, a scale is printed by one of the printheads at the beginning of the image, as depicted in FIG. 3, FIG. 4, and FIG. 5. Typically, the registration errors are documented in terms of pixels at the nominal resolution of the ink jet printing systems. Typically, the nominal resolution is 300 pixels per inch. The ability of some systems to print at 600 pixels per inch in the web-travel direction allows for the image to be designed in effectively ½ pixel steps. Additionally, to aid in identifying the step where register occurs, the image has heavy "tick" marks at the edges of the zero error step and light "tick" marks at the edge of each step extending both directions from the zero step. The marks essentially produce a series of tracks in the printing in the web-travel direction that allows for quick and accurate data recording from the test prints. With little effort the user can identify the amount of registration error to ¼ pixel resolution using the innovative test pattern.

Another aspect of the image design to consider is the width of each step. The width of each step creates more or less visible translation of the registration error. For example, if the expected range of registration error is 5 pixels (at 300 pixels per inch) and the width of each step is 10 pixels then the 5 pixels of error results in the contrasting "band" to vary by 100 pixels (⅓") or a magnification of 20 times. Likewise, the same error exhibited with steps 40 pixels wide results in the contrasting "band" to vary by 400 pixels (1⅓") or a magnification of 80 times. Various scenarios considering the width of the step and overall width of the printed image for each print head pair combination can be effectively used. Regardless, the same principles of the present methods still apply. For general use, images have typically been designed with a step width of 24 pixels or a magnification of 48 times. With just one set of innovative bitmapped font characters, the user can use the embodied methods effectively for a variety of print head pair combinations to be printed at the same time at up to +/−5 pixels of error translation at production speeds even.

Due to the design of the step patterns and lines repeating every 8 pixels, multiple contrasting "bands" are visible within the printed image. The multiple contrasting "bands" occur by design at +/−4 pixels (at 300 pixels per inch) from the true registration. This effect proves useful when using the test image to characterize registration variation since the registration variation can be measured by following any contrast "band" regardless of which one represents the actual registration error. When actual registration error "band" exceeds the image width (goes off the scale), the user can simply move to the next "band" to identify the error and add or subtract the 4 pixels accordingly. Usually in addition to the innovative test patterns, some more conventional registration features can be added to the printed image in order to identify gross registration error and to aid in identifying which "band" represents the actual registration error for the purpose of adjusting the average error around the "zero" step.

The embodied methods are useful in the field of ink jet printing and have demonstrated many advantages over prior test methods. One such advantage can be realized when the embodied methods are used for the purpose of adjusting color-to-color registration average error. Typically, registration error variation defeats the ability of an operator to adjust adequately the average error to "zero" since obtaining enough samples/data to determine the corrections is difficult. The embodied methods allow an operator to "zero" the average registration error regardless of the amount of error variation because innovative test pattern continuously displays visible registration error data as the system is printing.

The embodied methods are advantageous in characterizing registration variation. In most cases, the patterns generated from this invention indicate deficiencies in the web control servo systems that are very difficult to measure with other means such as electronic tachometer signals or web tension sensors. In systems where a multitude of variables may affect system performance, the embodied methods can provide immediate feedback as to the effects on registration, thereby accelerating the debug and development process.

The alignment can represent the actual alignment of the print modules, variations in alignment between print modules, variations in alignment that occur sue to changes in speed of the media, and combinations thereof. When viewed from a distance, the points of intersection show up as "light bands" that is light color patterns, that wander up and down the overlapped image.

The embodied methods can involve an additional step of viewing the overlapped image to identify drift that can be problems in the printing system such as changes in speed of the media, flutter in the printing, vibration in the printing process, tension on the media, if print guides are acentric, if rollers are acentric, or if any lateral drift of the media in the printing process.

After printing and alignment problems are identified in the viewing step discussed above, the problems can be fixed, on line, real time, without having to shut off the printer. Problems that can be fixed in this way include tuning paper handling servo controls, replacing rollers, correcting roller location, adjusting paper tension, add rollers, adjusting tachometer based print media motion sensors by location, quantity of sensors or combinations thereof.

The innovative test pattern can be used to locate moderate registration error variations in order to help debug registration error sources. The use of the innovative test pattern can quickly lead to the source of the problem by correlating the test pattern data to possible system contributors, such as a match to a roller circumference (diameter), pulse generator or motor revolutions, electronic signals timing, or the like. Additionally, the use of the innovative test pattern can be used to compile a substantial amount of data in a short period of time concerning various system settings, such as speed, web tension, and paper types. The compilation of this data has led to significant discoveries and the broadening knowledge base of the key factors involved in creating a system with minimal color-to-color registration error.

The innovative test patterns created by the embodied methods are not as repetitive as the previous system and makes resolution of the problem(s) contributing to the error more difficult. Therefore, collecting as much data as possible is essential in understanding how to eliminate suspected variables efficiently.

The invention has been described in detail with particular reference to certain preferred embodiments thereof, but it will be understood that variations and modifications can be effected within the spirit and scope of the invention.

PARTS LIST 10. unwinder section
11. infeed nip motor servo system section
12. outfeed nip motor servo system section
13. rewinder motor servo system section
15. ink jet printhead or print modules
16. ink jet printhead or print modules
18. precision tachometer (pulse generator)
30. graphic image
32. parallel graphic information
34. graphic image
36. parallel graphic information
40. ink jet printhead or print modules
42. ink jet printhead or print modules
44. print media

The invention claimed is:

1. A method for evaluating the stability of print module registration for a printer, wherein the method comprises the steps of:
   a. forming a first graphic image, wherein the first graphic image comprises first parallel graphic information and a desired intersection point;

b. forming a second graphic image, wherein the second graphic image comprises second parallel graphic information formed at an angle relative to the first parallel graphic information;

c. sending the first graphic image to a first print module;

d. sending the second graphic image to a second print module;

e. printing the first and second graphic images onto print media forming an overlapped image, wherein the first and second graphic images are printed on by a pixel by pixel basis; and f. viewing the overlapped image to ascertain alignment based on the desired intersection point.

2. The method of claim 1, wherein the first and second parallel graphic information comprises parallel lines, parallel curves, a grid pattern, a bit map, and combinations thereof.

3. The method of claim 1, where the second graphic information is a set of single pixel steps.

4. The method of claim 1, wherein the angle is between about 1 degree and about 8 degrees when the first and second graphic images comprise a resolution between about 300 dpi and about 600 dpi.

5. The method of claim 1, wherein the angle is 2 degrees when the first and second graphic images comprise a resolution of 300 dpi.

6. The method of claim 1, wherein the steps of sending the first and second graphic images to the first and second print modules is performed by transmitting the first and second graphic images as digital files or physical plates.

7. The method of claim 1, wherein the first and second print module is selected from the group consisting of a printhead for an ink jet printer, a printing station for an offset printer, an electro-photographic printing station, a thermal transfer printhead, a printing station for a gravure printer, and combinations thereof.

8. The method of claim 1, wherein the first print module is separate from the second print module.

9. The method of claim 1, wherein the first and second print modules are in sequence.

10. The method of claim 1, wherein the print media is a cut sheet or web media.

11. The method of claim 1, wherein the step of printing the first and second graphic images is on a continuous pixel by pixel basis.

12. The method of claim 1, wherein the step of viewing to ascertain alignment comprises viewing actual print module alignment, variations in print module alignment, variations in alignment that occur due to changes in speed of the print media, and combinations thereof.

13. The method of claim 1, wherein step of viewing to ascertain alignment further comprises identifying problems, wherein the problems comprise: changes in speed of the print media, fluttering from printing, vibrations, tension on the print media, acentric orientation of the print guides, acentric orientation of the rollers, lateral drift of the print media, and combinations thereof.

14. The method of claim 13, further comprising the step of performing an adjustment step while still printing, wherein the adjustment step comprises the steps of a. tuning paper handling servo controls;

b. replacing rollers;

c. correcting roller location;

d. adjusting paper tension;

e. adding rollers;

f. adjusting tachometer based print media motion sensors by location, quantity of sensors; and g. combinations thereof.

15. A method for adjusting a print module registration for a printer, wherein the method comprises the steps of:

a. forming a first graphic image, wherein the first graphic image comprises first parallel graphic information and a first intersection point;

b. forming a second graphic image, wherein the second graphic image comprises second parallel graphic information and a desired intersection point, wherein the second parallel graphic information is formed at an angle relative to the first parallel graphic information;

c. sending the first graphic image to a first print module;

d. sending the second graphic image to a second print module;

e. printing the first and second graphic images onto print media forming an overlapped image, wherein the first and second graphic images are printed on by a pixel by pixel basis; and f. viewing to ascertain an average intersection point based upon comparing the first and second intersection points.

16. The method of claim 15, further comprising the step of adjusting the first and second graphic images based on the average intersection point until the average intersection point corresponds to a desired intersection point.

17. The method of claim 16, wherein the step of adjusting the first and second graphic images is performed while still printing.

18. The method of claim 16, wherein the step of adjusting the first and second graphic images is performed by a step selected from the group consisting of:

a. adjusting spacing between the first and second print modules;

b. adjusting spacing of at least one print modules relative to the print media;

c. adjusting printing of at least one graphic image;

d. modifying positioning between the at least one print module and the print media;

e. modifying positioning between at least one print module and at least one print module;

f. combinations thereof.

19. The method of claim 18, wherein the step adjusting printing of at least one graphic image is performed by using an electronic delay.

20. The method of claim 16, wherein the continuous pixel by pixel basis is selected from the group consisting of substantially parallel to the print media, substantially perpendicular to the print media, and combinations thereof.

21. The method of claim 15, wherein the wherein the first and second parallel graphic information comprises parallel lines, parallel curves, a grid pattern, a bit map, and combinations thereof.

22. The method of claim 15, wherein the step of printing the first and second graphic images is on a continuous pixel by pixel basis.

23. The method of claim 15, wherein at least one graphic image comprises an index marking to indicate an error amount, wherein the error amount corresponds to adjustment needed to produce a desired point of intersection.

* * * * *